(12) United States Patent
Wang et al.

(10) Patent No.: US 9,264,357 B2
(45) Date of Patent: Feb. 16, 2016

(54) APPARATUS AND METHOD FOR TABLE SEARCH WITH CENTRALIZED MEMORY POOL IN A NETWORK SWITCH

(71) Applicant: Xpliant, Inc., San Jose, CA (US)

(72) Inventors: Weihuang Wang, Los Gatos, CA (US);
Tsahi Daniel, Palo Alto, CA (US);
Mohan Balan, Santa Clara, CA (US);
Nimalan Siva, San Ramon, CA (US)

(73) Assignee: Xpliant, Inc., San Jose, CA (US)

( * ) Notice: Subject to any disclaimer, the term of this patent is extended or adjusted under 35 U.S.C. 154(b) by 96 days.

(21) Appl. No.: 14/201,692

(22) Filed: Mar. 7, 2014

(65) Prior Publication Data

US 2014/0321467 A1 Oct. 30, 2014

Related U.S. Application Data

(60) Provisional application No. 61/817,810, filed on Apr. 30, 2013.

(51) Int. Cl.
*H04L 12/741* (2013.01)

(52) U.S. Cl.
CPC .................................. *H04L 45/745* (2013.01)

(58) Field of Classification Search
CPC ...................................................... H04L 45/745
See application file for complete search history.

(56) References Cited

U.S. PATENT DOCUMENTS

| | | | |
|---|---|---|---|
| 6,970,971 B1 * | 11/2005 | Warkhede et al. | 711/108 |
| 7,565,482 B1 * | 7/2009 | Rangarajan et al. | 711/108 |
| 2004/0024915 A1 * | 2/2004 | Abe | 709/250 |
| 2008/0052488 A1 * | 2/2008 | Fritz et al. | 711/216 |
| 2008/0077793 A1 * | 3/2008 | Tan et al. | 713/168 |
| 2008/0126321 A1 * | 5/2008 | Chong et al. | 707/3 |
| 2009/0201935 A1 * | 8/2009 | Hass et al. | 370/395.32 |
| 2011/0292830 A1 * | 12/2011 | Yanggratoke et al. | 370/253 |
| 2012/0023082 A1 * | 1/2012 | Kotha et al. | 707/706 |
| 2013/0163595 A1 * | 6/2013 | Doo et al. | 370/392 |
| 2013/0212670 A1 * | 8/2013 | Sutardja et al. | 726/13 |
| 2013/0246698 A1 * | 9/2013 | Estan et al. | 711/108 |

\* cited by examiner

*Primary Examiner* — Brian D Nguyen
(74) *Attorney, Agent, or Firm* — Cooley LLP

(57) ABSTRACT

A network switch includes packet processing units in a first processor core. An interface module is connected to the packet processing units. The interface module supports a unified table search request interface and a unified table search response interface. A common memory pool is connected to the interface module. The common memory pool includes a variety of memory types configurable to support multiple parallel table search requests.

20 Claims, 7 Drawing Sheets

| 8-bit | 48-bit | 1-bit | 6-bit | 5-bit | 3-bit | 1-bit | 1-bit | 4-bit | 2-bit | 237-bit |
|---|---|---|---|---|---|---|---|---|---|---|
| | | | | search_cmd_0 | | | | | | search_cmd_{1,2,3} |
| table_id | key_byte_mask | ecmp_en | ecmp_hash_byte_start | rslt_qw_start | rslt_qw_inc | regret table | age_en | hash_way_cnt | eng_id | ... |

APPARATUS AND METHOD FOR TABLE SEARCH WITH CENTRALIZED MEMORY POOL IN A NETWORK SWITCH

CROSS-REFERENCE TO RELATED APPLICATION

The present application claims priority to U.S. Provisional Patent Application Ser. No. 61/817,810, filed Apr. 30, 2013, the contents of which are incorporated herein by reference.

TECHNICAL FIELD

The present application relates to communications in network environments. More particularly, the present invention relates to performing table searches in a high speed network processing unit.

BACKGROUND

Examples of table searches in a network switching unit include: hashing for a Media Access Control (MAC) address look up, Longest-Prefix Matching (LPM) for Internet Protocol (IP) routing, wild-card matching for an Access Control List (ACL) and direct memory access for control data.

Software Defined Networks (SDN) have emerged in the market. An SDN allows one to manage network services through an abstraction of lower level functionality. This is done by decoupling the system that makes decisions about where traffic is sent (the control plane) from the underlying systems that forwards traffic to the selected destination (the data plane).

Table search is at the core of a flexible control path as seen by software. A switch performs a look up of each incoming packet and takes action as instructed by a search hit result or a default action as instructed by a table search miss.

Since table searches are critical to SDNs, it would be desirable to provide improved techniques for performing such searches.

SUMMARY

A network switch includes packet processing units in a first processor core. An interface module is connected to the packet processing units. The interface module supports a unified table search request interface and a unified table search response interface. A common memory pool is connected to the interface module. The common memory pool includes a variety of memory types configurable to support multiple parallel table search requests.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

DETAILED DESCRIPTION

Figure 1:
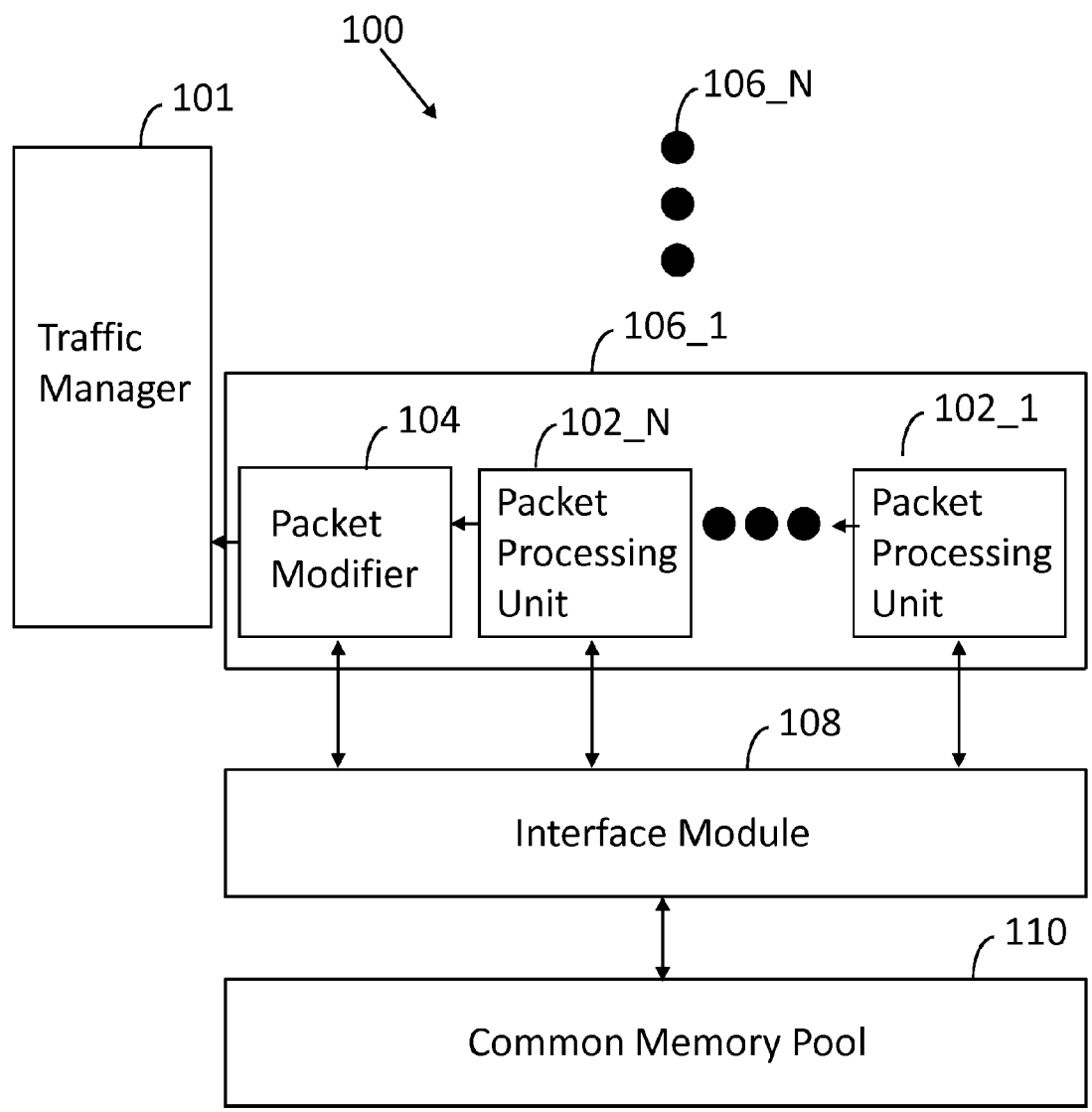
FIG. 1 illustrates a network switch configured in accordance with an embodiment of the invention.

FIG. 1 illustrates a network switch 100 configured in accordance with an embodiment of the invention. The network switch 100 includes a traffic manager 101 and one or more packet processing units 102_1 through 102_N, which deliver processed packets to a packet modifier 104. Such components form a core 106_1. There may be multiple instances of each core, such as cores 106_1 through 106_N. An interface module 108 provides an interface to a common memory pool 110. As will be appreciated with the discussion below, this architecture supports a centralized table search engine for a multiple core network switch. Each core 106 may utilize the same interface module 108 and common memory pool 110.

The architecture supports multiple parallel table searches through a unified request and result interface. The common memory pool 110 supports efficient use of memory resources. As discussed below, the architecture also flexibly generates search keys to perform different types of table searches with different sized search keys. Hybrid table searches are also supported.

Figure 2:
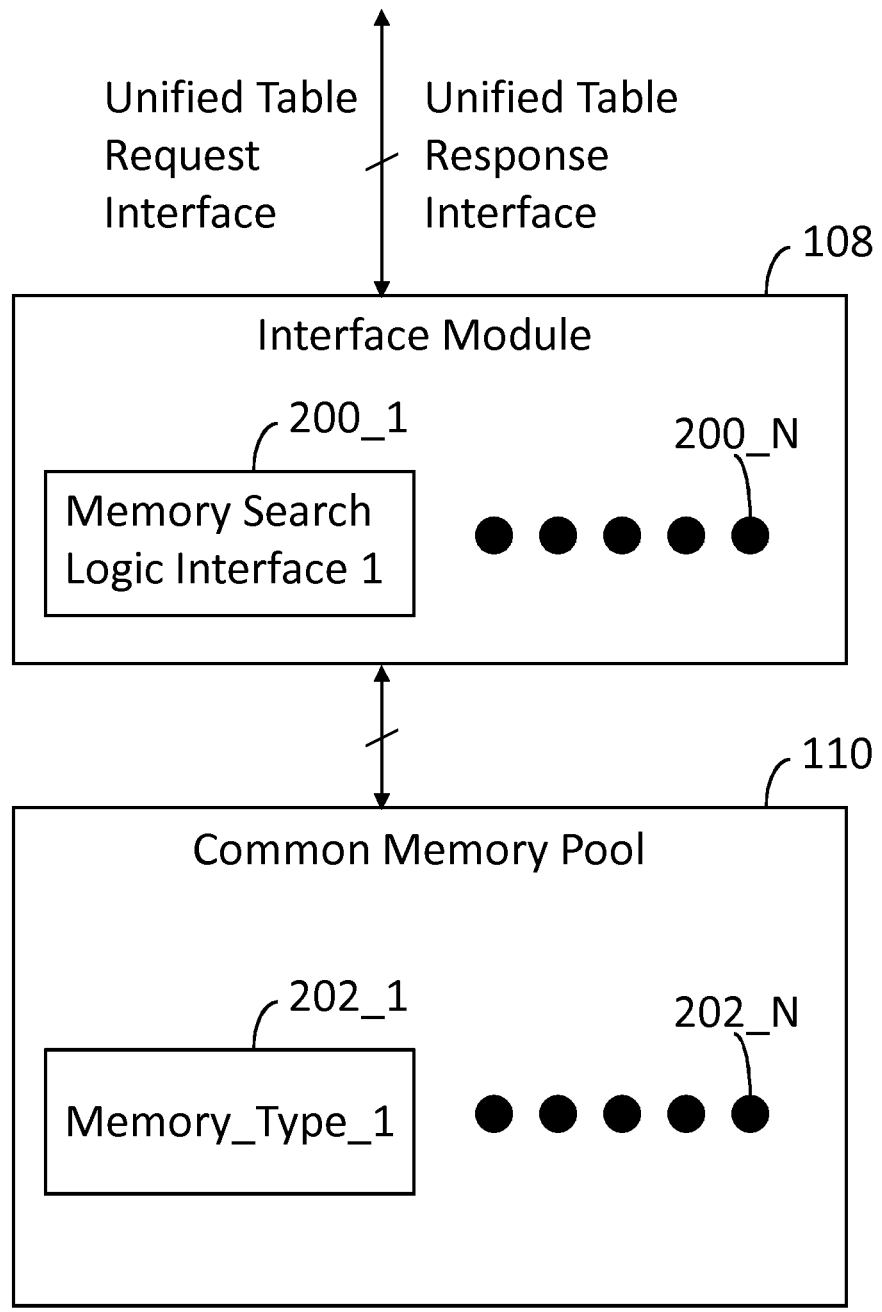
FIG. 2 illustrates an interface module and common memory pool utilized in accordance with an embodiment of the invention.

FIG. 2 illustrates that the interface module 108 includes a set of memory search logic interfaces 200_1 through 200_N. Each memory search logic interface 200 observes a unified table request interface format and a unified table response interface format. Each memory search logic interface 200 makes independent requests. Thus, the common memory pool 110 processes large numbers of parallel requests.

The common memory pool 110 includes a variety of memory types 202_1 through 202_N. The memory types may include direct access memory (e.g., Static Random Access Memory (SRAM) and Ternary Content Addressable Memory (TCAM). TCAM supports a "Don't Care" or "X" state for one or more bits in a stored data word. This adds flexibility, but the added flexibility comes at an additional cost over a two-state memory since the TCAM encodes three possible states instead of the two. A TCAM is often used for longest prefix match and access control list searches. TCAM is an expensive switch component. As discussed below, the embodiments of the invention flexible exploit TCAM resources.

Figure 3:
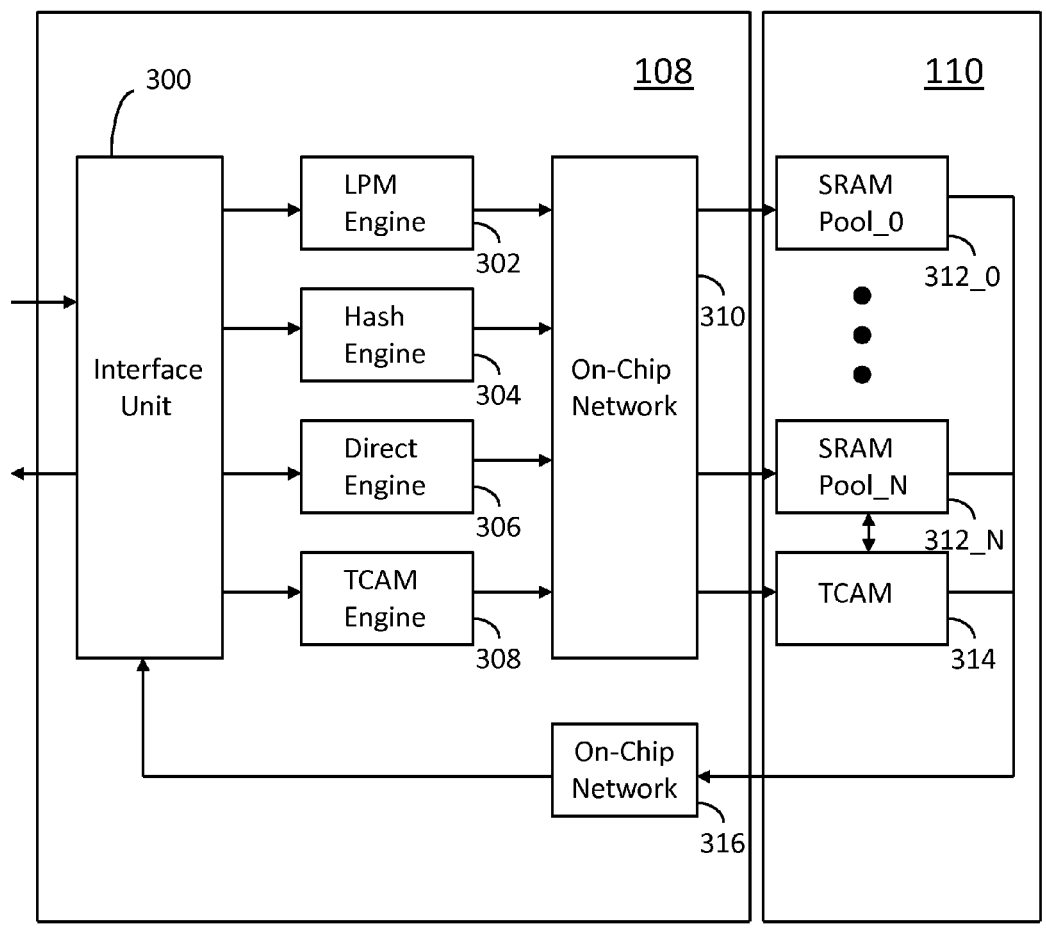
FIG. 3 illustrates an example interface module and common memory pool utilized in accordance with an embodiment of the invention.

FIG. 3 illustrates an embodiment of the interface module 108 and the common memory pool 110. The interface module 108 includes an interface unit 300 to receive table search requests. The table search request is directed toward an engine that includes logic to implement a specified table search request. The engines may include a Longest Prefix Match (LPM) engine 302, a hash search engine 304, a direct memory search engine 306 and a TCAM engine 308. An embodiment of the invention includes multiple instances of each engine. The output of each engine is directed toward an on-chip network 310. The on-chip network 310 is implemented to provide access to all of the memory resources in the common memory pool 110, as specified by the table request interface.

In this example, the common memory pool 110 includes a set of SRAM resources 312_0 through 312_N and a TCAM 314. A hit in the TCAM 314 results in an access to its dedicated SRAM resource for corresponding control information, as discussed below. Results of table look ups in the memory are directed toward on-chip network 316, which routes results to the interface unit 300.

Figures 4, 5:
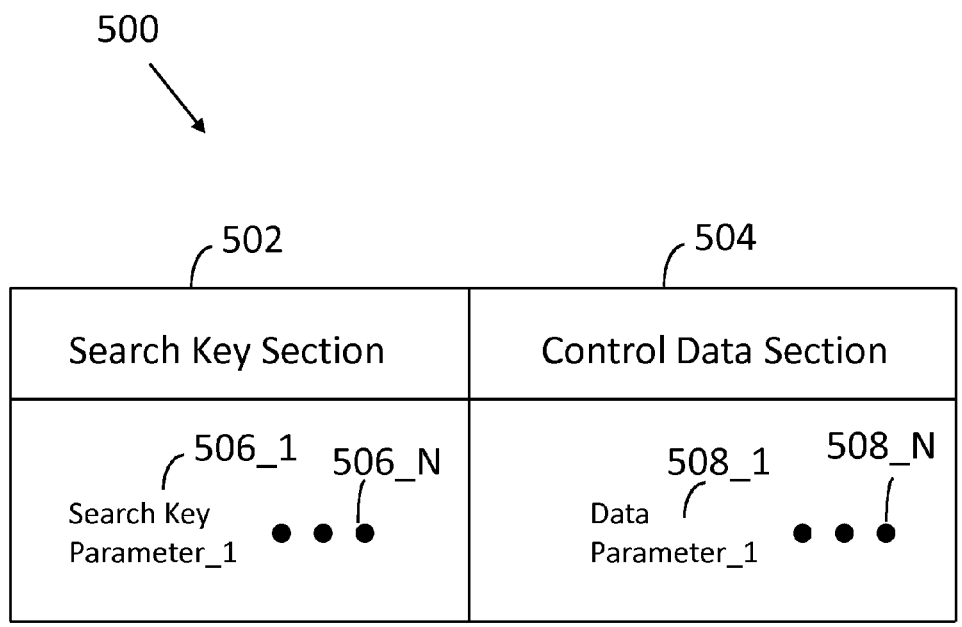
FIG. 4 illustrates table search configuration information utilized in accordance with an embodiment of the invention.
FIG. 5 illustrates general table search parameters associated with an embodiment of the invention.

FIG. 4 illustrates a configuration table that may be used in accordance with an embodiment of the invention. The configuration table establishes a set of profiles in the interface unit 300. The configuration table establishes how a search key is formed, what types of searches to perform and which processing engine to utilize. In this example, the configuration table has four columns and eight rows. The figure illustrates bit fields for one column. The first field is an 8 bit "table_id", which serves as an index into a row of the table. Since there are eight rows in this example, there is access to eight different search profiles. Each profile contains up to four search commands; each search may be to the same or a different table.

The next field is a 48 bit "key_byte_mask" field. This field specifies the construction of a search key. That is, the mask tells which bits from the input unified table request interface need to be interpreted for a particular search command. For instance, a destination address for a layer-2 bridge will set the byte-bitmap corresponding to a location of destination MAC address as well as bridge domain for a hash lookup. At the same time, a source address look up may be performed in a separate search command, with the search key byte-mask being set for the source MAC address and same bridge domain. The flexibility of forming a search key with a byte-bitmap not only simplifies control path design, but also reduces hardware, as there is no extra hardware needed to extract the same bridge-domain twice for these two lookups. Furthermore, software may specify priority for certain search requests. For instance, in a bridging environment, a user may set source address lookups as lower priority, such that the search engine only performs this search when there is spare bandwidth, since the source address can always be derived from a future packet. This is one example illustrating the application as well as the benefit of the search engine scheme. It should also be appreciated that the invention provides a protocol-independent search key, which facilitates flexibility.

The "ecmp_en" and "ecmp_hash_byte_start" fields are specific to LPM searches. The "rslt_qw_start" field specifies a starting point for a logical communication lane to which results are sent, while the "rslt_qw_inc" field specifies an incremental number of lanes to which to send results. For example, results of a single search command may be 256-bits wide, divided into four lanes, each being 64 bits wide. The result for the entire search profile can be up to 1024 bits so it may take multiple cycles to return all results. Each search command configures the "rslt_qw_start" between 0-15 and "result qw_inc" between 0-3 to specify where to put the result in 16 double words.

The "regret_table" field is a quality of service parameter; it specifies when a search engine is congested, which requires redeployment of the query. The "age_en" field is a table entry eviction parameter that is helpful for debugging purposes. The "hash_way_cnt" field supports specific hash searches. The "eng_id" field specifies one of multiple processing engines.

FIG. 5 illustrates a generic search engine table 500 configured in accordance with an embodiment of the invention. The search engine table 500 specifies a search request, which is processed in accordance with the configuration information of FIG. 4. In one embodiment, the search engine table 500 includes a search key section 502 and a control data section 504. The search key section 502 has individual search key parameters 506_1 through 506_N. The search key parameters may be selected from key size, hash function configuration, memory tile configuration and the like. Thus, the invention supports different specified key sizes. The hash function configuration parameter allows one to specify different ways to map to memory. The memory tile configuration is the range of a physical memory resource.

Similarly, the control data section 504 has individual data parameters 508_1 through 508_N. The data parameters may be selected from data size, data memory tile configuration and the like. Thus, the invention supports different data size results. The memory tile configuration allows for abstracted references to memory resources.

Thus, both key size and control data can be configured with different sizes; all tables, other than TCAM tables, are configured to be stored in some part of the centralized SRAM pools flexibly based on exact application usage.

Figure 6:
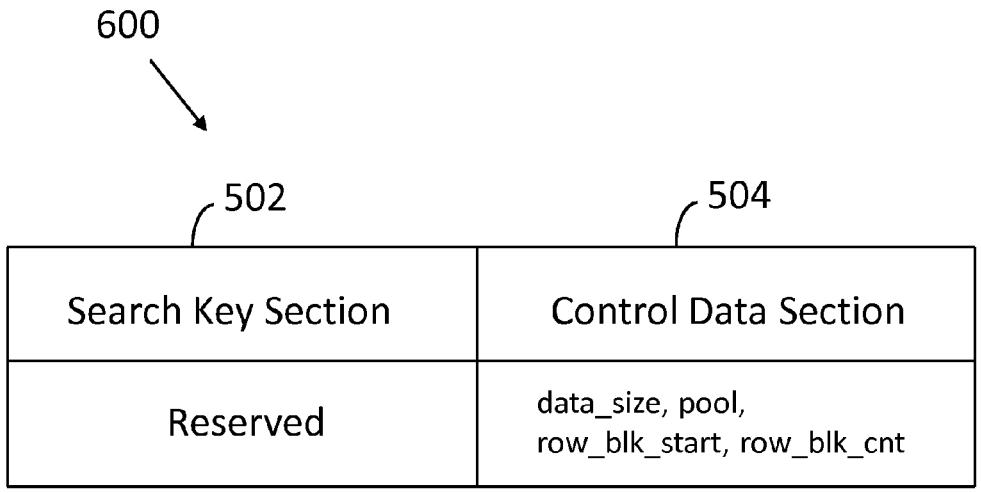
FIG. 6 illustrates direct table access search parameters associated with an embodiment of the invention.

The general search engine table 500 supports various search queries. FIG. 6 illustrates a table 600 configured for direct table access. The search key section 502 is reserved. The control data section includes data size, pool, row_blk_start and row_blk_cnt parameters. These parameters may be used in connection with an SRAM pool with 16 MB of SRAM divided into 8 identical pools. Each pool has 2 MB of memory. Dual-port memories supporting 1 read and 1 read/write operation each cycle may be used. Physically, all SRAM tiles in a pool are organized into 8 tiles, each 256 bits wide and 8K rows. Row block is an intermediate representation in between high-level table address and physical memory address. This allows a decoupling of the logic view of the memory pool from the physical tile selection. Each row block represents 1K rows.

The SRAM can be flexibly configured to store different table types as well as entry widths. The algorithm of hash table and LPM table lookup requires multiple memory accesses for best memory efficiency. The division of SRAM resources into 8 separate pools allows for parallel memory accesses and reductions of on-chip-network sizes.

Tables associated with SRAM are assigned in row-block, where each row-block is 1024 memory rows. A table entry can be 32-bits, 64-bits, 128-bits, 256-bits or 512-bits, while the physical SRAM's are each 256-bits wide. If an entry is less than 256-bits, multiple entries reside in one SRAM row, with lower bits of logic table addresses used to select the one of the multiple entries in the same row, and upper bits of logic table addresses used to select the memory row and memory tile. If an entry is 512-bits wide, it uses two SRAM tiles. A dual-tile-entry stores its lower 256-bits in even-numbered tiles, and its higher 256-bits in the same row in the immediate next tile. While each tile has a maximum of two accesses each clock cycle, multiple tables can reside in the same tile, allowing for access to each table in time-domain-multiplexing fashion. Typically, depending on packet parsing results, different packets from the same source may require different look ups; consequently multiple tables are configured in the same memory tile, but are accessed for different packets if the pipeline provides large table capacity. With a minimum table size being 1024 entries, the largest table, however, can occupy all the SRAM resources. Size of search tables can be traded off with number of search tables with different requirements of each specific network application.

Figure 7:
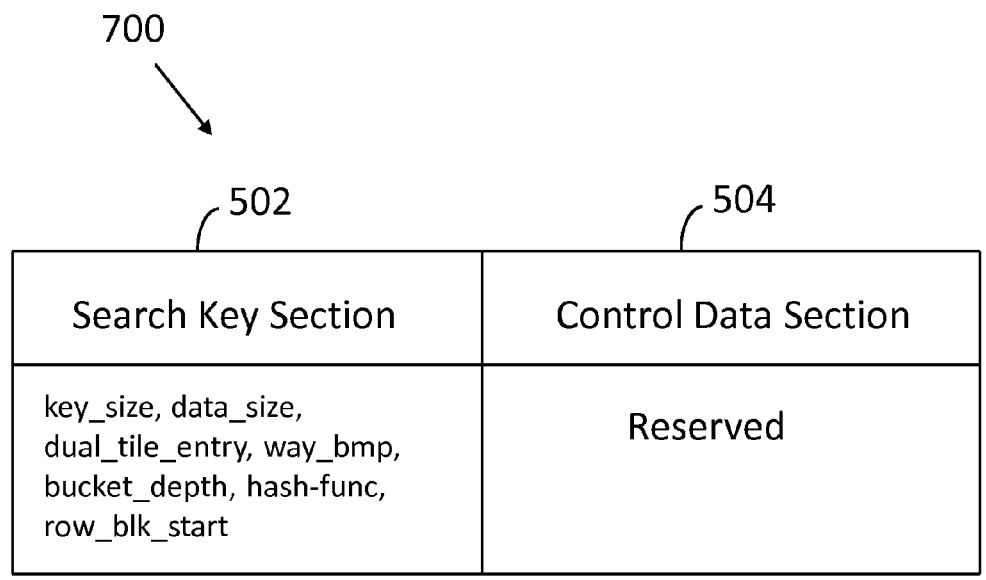
FIG. 7 illustrates hash search parameters associated with an embodiment of the invention.

FIG. 7 illustrates a table 700 configured for hash searches. The control data section 504 is reserved. The search key section has the following parameters: key_size, data_size, dual_tile_entry, way_bmp, bucket_depth, hash_func and row_blk_start. In this example, the search engine hash function can choose from seven different sizes; there are four different hash functions to choose from. Each way is fixed to a corresponding pool; control data goes with a key.

Figure 8:
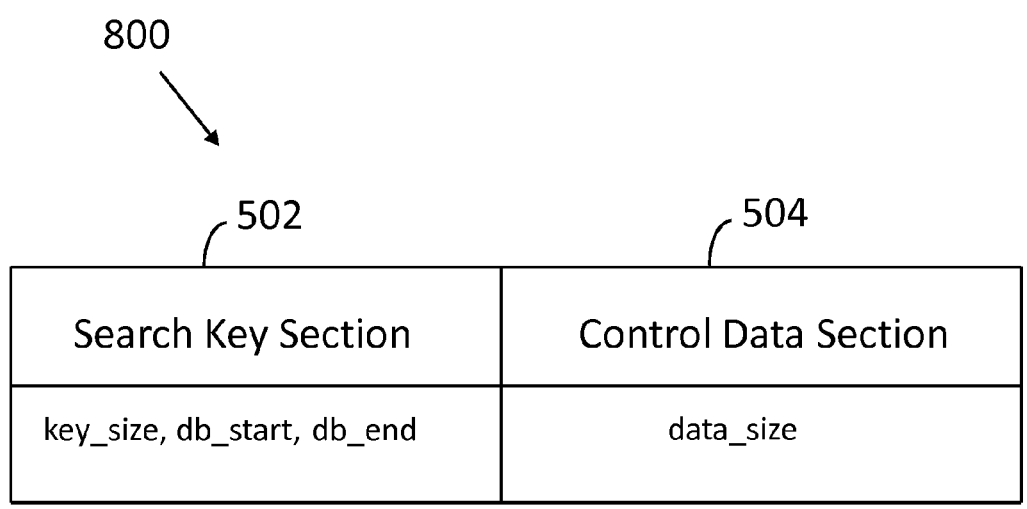
FIG. 8 TCAM search parameters associated with an embodiment of the invention.

FIG. 8 illustrates a table 800 configured for TCAM searches. The control data section 504 has a key size parameter, a database start parameter and a database end parameter. The control data section has a data size parameter. In one embodiment the search key section has allowed sizes of 64, 128, 192 and 384 bits. In one embodiment, the data size may be 32, 64, 128 or 256 bits.

All the TCAM lookups are routed through an on-chip-network to a pool of shared TCAM's 314, which has associated on-die SRAM's for storage of the corresponding control data. The control data goes through another on-chip network and routes back to individual table result interfaces.

Figure 9:
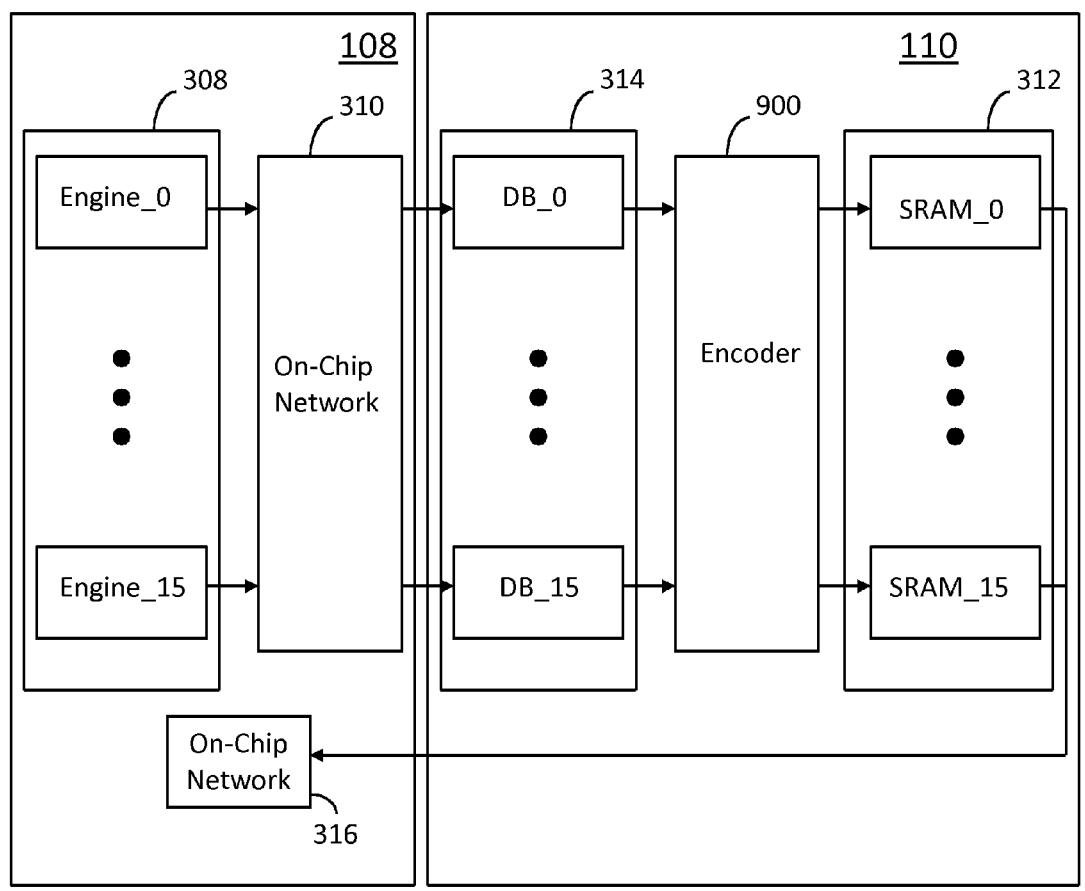
FIG. 9 illustrates a TCAM architecture utilized in accordance with an embodiment of the invention.

FIG. 9 illustrates that in an embodiment of the invention, the TCAM engine 308 comprises 16 engines Engine_0 through Engine_15. TCAM 314 is divided into 16 databases DB_0 through DB_15. Each database may have a set of tiles.

Each TCAM database can be configured to be a different key-size, e.g., 64-bits, 128-bits, 192-bits or 384-bits. A TCAM table can be one or more contiguous TCAM databases. As such, in one embodiment there are 16 different TCAM tables, each with 1 database, or 1 TCAM table with all the 16 databases. FIG. 9 illustrates TCAM 314 comprising 16 databases, DB_0 through DB_15. Depending on the application, multiple small-sized tables or few large-sized TCAM tables can be configured, fully utilizing the hardware-expensive and power-hungry TCAM memory tiles.

Output from the TCAM 314 is applied to an encoder 900, which accesses SRAM entries corresponding to a TCAM hit. In this embodiment, SRAM pool 312 includes SRAM banks SRAM_0 through SRAM_31.

The search engine is capable of performing up-to 16 parallel TCAM lookups. There are latency tradeoffs contingent upon the configuration. On one extreme, a single large table occupies all memory space, but has a relatively large latency. Multiple smaller tables may populate the entire memory, in which case smaller tables have smaller latencies.

Usage of dedicated SRAM for each TCAM database reduces access latency for TCAM tables. This scheme makes a TCAM table an attractive alternative for a variety of applications due to its low latency and flexibility. Those applications include but are not limited to ACL and LPM.

All direct-access table, hash table and LPM tables share the centralized on-chip SRAM pools, which are inter-connected with the processing engines and result interfaces through separate on-chip networks. If a table entry becomes stale, and is not being hit by any packets in a period of time, the search engine notifies the CPU through table aging mechanisms.

Each of the hash processing engines has an associated input buffer to queue up the multiple incoming requests. When an engine becomes oversubscribed by all requester, some lower priority requests are dropped. The ability to prioritize incoming requests allows for fully utilizing spare bandwidth, especially in the context of packet switches where varying lengths of packets require over-provision of processing bandwidth. This scheme provides greater flexibility in system configuration.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A network switch, comprising;
   a plurality of packet processing units in a first processor core;
   an interface module connected to the plurality of packet processing units, the interface module supporting a unified table search request interface and a unified table search response interface, wherein the interface module includes individual engines with logic to coordinate different table search requests and an interface unit configured in accordance with a configuration table; and
   a common memory pool connected to the interface module, the common memory pool including a variety of memory types configurable to support a plurality of parallel table search requests.

2. The network switch of claim 1 further comprising a second plurality of packet processing units in a second processor core connected to the interface module.

3. The network switch of claim 1 wherein the interface module is configured to support different types of table searches with different sized search keys.

4. The network switch of claim 1 wherein the variety of memory types includes Static Random Access Memory and Ternary Content Addressable Memory.

5. The network switch of claim 1 wherein the engines include a Longest Prefix Match engine, a hash search engine, a direct memory search engine and a Ternary Content Addressable Memory (TCAM) engine.

6. The network switch of claim 1 wherein the configuration table includes a plurality of columns and rows, each row specifying a search profile and each column specifying a search command for the search profile.

7. The network switch of claim 1 wherein the configuration table includes a table identification field operative as an index into a row of the configuration table.

8. The network switch of claim 1 wherein the configuration table includes a key byte mask field to specify the construction of a search key.

9. The network switch of claim 1 wherein the configuration table includes Longest Prefix Match search parameters.

10. The network switch of claim 1 wherein the configuration table includes logical communication lane parameters.

11. The network switch of claim wherein the configuration table includes a quality of service parameter.

12. The network switch of claim 1 wherein the configuration table includes a table entry eviction parameter.

13. The network switch of claim 1 wherein the interface module processes a table search request which is processed in accordance with parameters of the configuration table.

14. The network switch of claim 13 wherein the table search request includes a search key section and a control data section.

15. The network switch of claim 14 wherein the search key section includes parameters selected from a key size, hash function configuration and memory tile configuration.

16. The network switch of claim 14 wherein the control data section includes parameters selected from data size and data memory tile configuration.

17. The network switch of claim 1 wherein the common memory pool includes a plurality of Ternary Content Addressable Memory (TCAM) resources divided into addressable database segments.

18. The network switch of claim 17 wherein output from the TCAM resources is processed by an encoder to access Static Random Access Memory information corresponding to a TCAM hit.

19. The network switch of claim 1 wherein the common memory pool is alternately configurable for different numbers of tables and different search types.

20. The network switch of claim 1 wherein the common memory pool is alternately configurable for large capacity long latency tables and small capacity short latency tables.

* * * * *